W. J. MILLER.
PROCESS AND APPARATUS FOR CONTROLLING THE FLOW OF GLASS.
APPLICATION FILED JAN. 25, 1917.
1,260,428.
Patented Mar. 26, 1918.
3 SHEETS—SHEET 2.
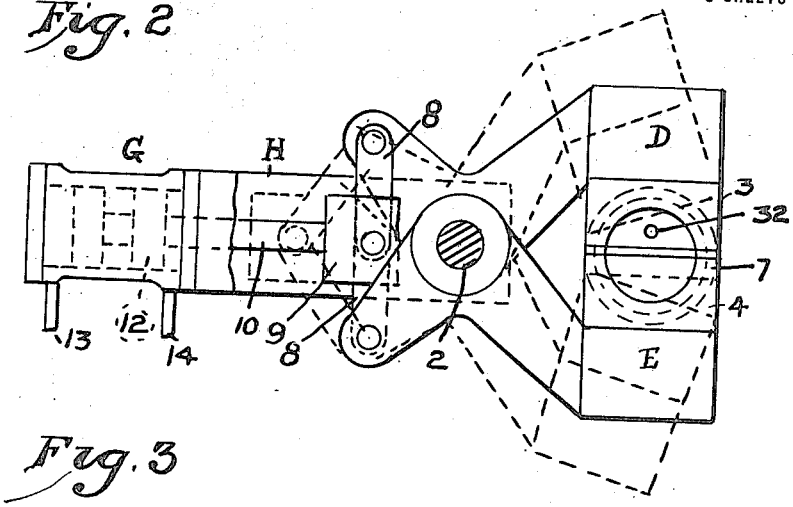
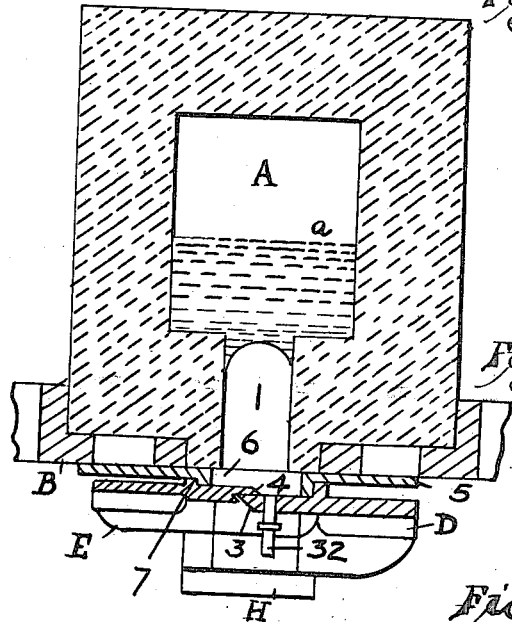
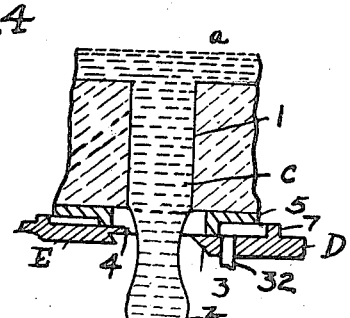
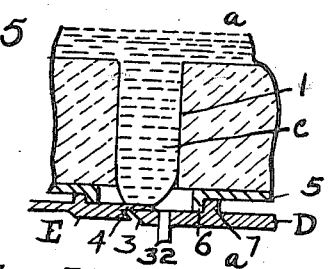
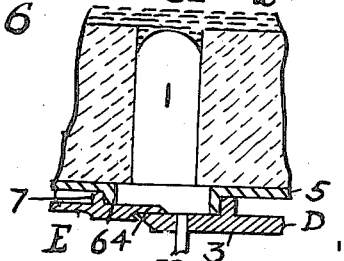
WITNESS
R.F.Dilworth
INVENTOR.
William J. Miller
by Edward A. Lawrence
his attorney.

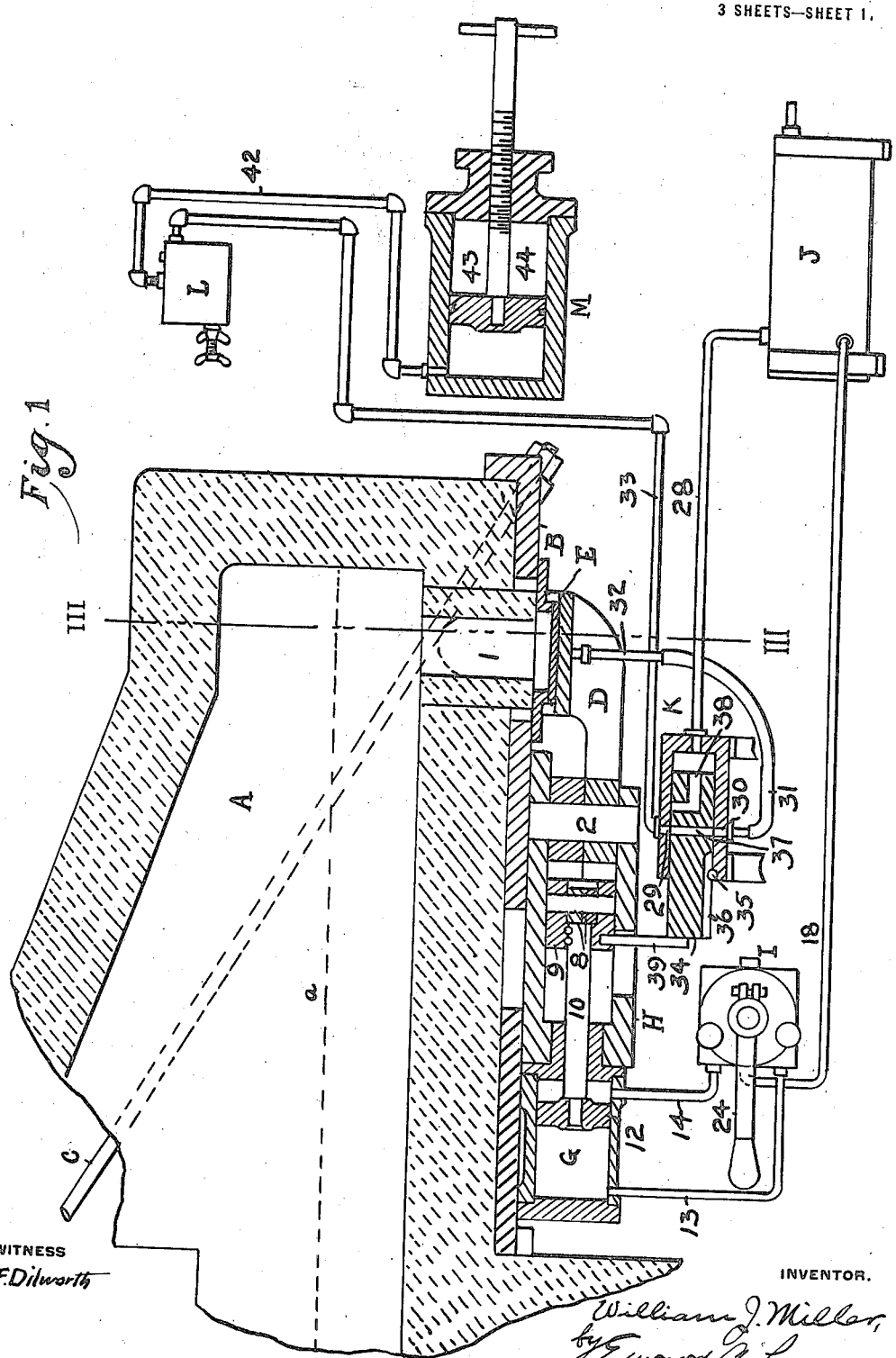

W. J. MILLER.
PROCESS AND APPARATUS FOR CONTROLLING THE FLOW OF GLASS.
APPLICATION FILED JAN. 25, 1917.
1,260,428.
Patented Mar. 26, 1918.
3 SHEETS—SHEET 3.
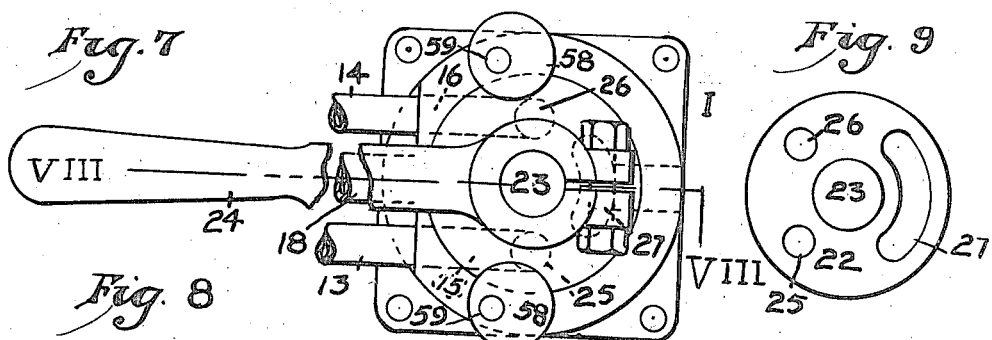
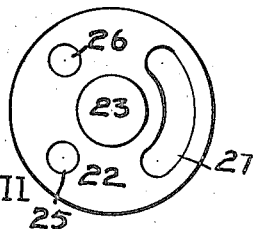
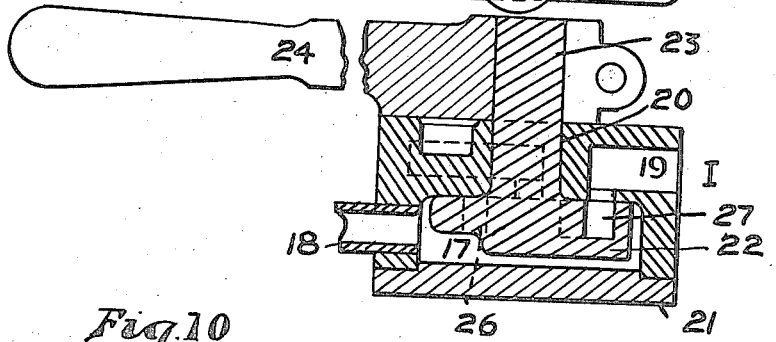
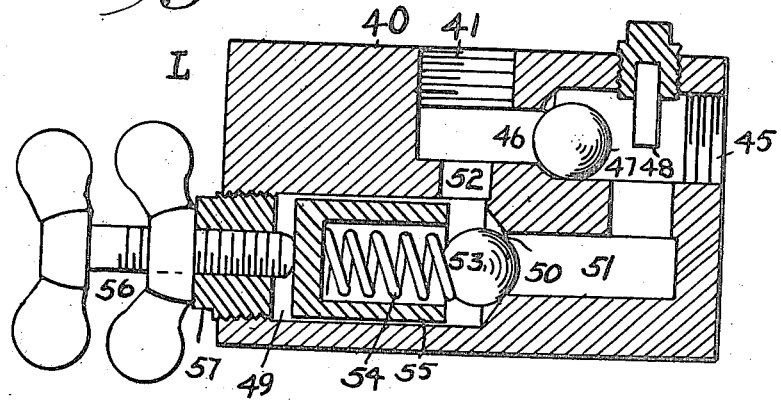
WITNESS
R.F. Dilworth
INVENTOR.
William J. Miller
by Edward A. Lawrence
his attorney.

UNITED STATES PATENT OFFICE.

WILLIAM J. MILLER, OF SWISSVALE BOROUGH, PENNSYLVANIA.

PROCESS AND APPARATUS FOR CONTROLLING THE FLOW OF GLASS.

1,260,428.     Specification of Letters Patent.     Patented Mar. 26, 1918.

Application filed January 25, 1917. Serial No. 144,320.

*To all whom it may concern:*

Be it known that I, WILLIAM J. MILLER, a citizen of the United States, and residing in the borough of Swissvale, in the county of Allegheny and State of Pennsylvania, have invented or discovered new and useful Improvements in Processes and Apparatus for Controlling the Flow of Glass, of which the following is a specification.

My invention relates to the control of the gravity flow of glass from a tank or other source of supply of molten glass, and more particularly comprises a new and improved process and means for controlling and regulating such flow.

In present practice the portion of glass protruding from the discharge port is sheared off and drops into the waiting mold positioned to receive it, the chilling contact of the shearing mechanism with the neck of the glass forming a scar at the severed butt which, when the shearing operation is repeated to load the next mold, interferes with the subsequent pressing or blowing of the blank or causes a scar in the bottom of the finished ware which seriously reduces its value or renders it worthless. Again, as soon as the shears are retracted and the support removed from under the glass depending through the discharge port, the glass at once resumes its downward movement, thus allowing insufficient time for the removal of the loaded mold and the substitution of an empty mold, before the shearing operation must be repeated.

The objects which I have in view are, first, the removal of the scar after each shearing operation, and, second, the prevention of the flow of glass down out of the discharge port until sufficient time has elapsed for the substitution of an empty mold prior to the next shearing operation.

I accomplish these objects by providing means whereby, when a shearing operation is completed, compressed air, sufficient in quantity and pressure, is admitted at the bottom or outer end of the discharge port to force the glass up along said port to a point where the scar will be eliminated by reheating, and to hold back or retard the downward or outward flow of glass until a fresh mold can be positioned prior to the next shearing operation.

The blast of air must be of sufficient force to overcome the inertia of the glass and start it moving upwardly or inwardly in the discharge port. However, experience shows that the resistance of the glass diminishes as it travels, so that a blast of air at a constant or sustained pressure sufficient to start the glass to move, will cause the rate of travel of the glass to increase until the glass is shot back into the bath of molten glass in the furnace, thus forming air bubbles. The result is that the next blank severed will contain bubbles and streaks, rendering the product, when blown or pressed from the blank, imperfect. I overcome this difficulty by using a blast of air which at first is strong enough to overcome the inertia of the glass and start it moving up or in along the discharge port but which progressively diminishes in pressure, so that the severed neck is held supported in the upper or inner end of the discharge port where the heat is sufficient to melt off the scar but said neck is not driven up into the bath of molten glass. Thus the formation of air bubbles and streaks is avoided.

In the accompanying drawings, which are, however merely intended as illustrative of the principles of my invention and not to limit the scope of the same to the structures shown, Figure 1 is a diagrammatic view, partially in vertical section, showing the boot of a glass tank, or other supply of molten glass, to which my invention is applied; Fig. 2 is a plan view of the shearing device and its operative mechanism dismounted from the boot, the top wall of the casing being partially cut away to show parts; Fig. 3 is a vertical section taken along the line III—III in Fig. 1; Figs. 4, 5 and 6 are broken details, similar to Fig. 1, and showing, respectively, the glass blank depending from the discharge port previous to the shearing operation; the severed butt of glass in the discharge port immediately after the shearing operation, and the scarred butt forced upwardly in said port by the air blast; Fig. 7 is an enlarged plan view of the four-way valve used to operate the shearing device; Fig. 8 is a vertical section of the same taken along the line VIII—VIII in Fig. 7; Fig. 9 is a plan view showing the valve disk, and Fig. 10 is a vertical section of the pressure reducing valve.

The following is a detailed description of the drawings.

A represents the boot of a glass tank or other source of supply of molten glass, the level of the glass being indicated by *a*. Said boot is supported by the usual steel bottom plates B and tie rods C, the boot itself being built of refractory material in the usual manner. 1 is the vertical discharge port through the bottom of the boot for the escape of glass.

The shearing mechanism is mounted on the under face of the bottom plates B, and is of the following construction.

D and E are a pair of shearing members pivotally supported by means of a stud 2 depending from the plate B and provided with shearing blades 3 and 4 which are adapted to coact, as shown in Figs. 2, 3, 5 and 6, to shear off the depending blank *b* from the neck *c* of glass depending through the port 1. Surrounding the mouth of port 1 is a metal plate 5 provided with a depending circular boss or flange 6 concentric with the port and against which abut the vertical semi-circular bosses or ribs 7 on the blades to seal the bottom of the hole 1 when the shears are closed. The members D and E do not cross over at their pivot point but are provided with the angular rear ends shown in Fig. 2.

The rear ends of the members D and E are connected by pivoted links 8 with a crosshead 9 fixed on the forward end of a piston rod which extends through the head of a cylinder G connected to a casing H in which the outer end of the piston rod reciprocates. The crosshead slides in the interior of the casing H to steady the movement of the piston rod 10. 12 is a piston moving in the cylinder and rigidly mounted on the outer end of the piston rod 10. The side walls of the casing H are slotted longitudinally to give clearance for links 8 and the bottom of the casing is extended forwardly under the stud 2 to hold the members D and E in position on said stud. The top wall of the casing is partially cut away in Fig. 2 to show the end of the piston rod and the links.

At either end, or on either side of the piston 12, the cylinder G is supplied with compressed air by means of pipes 13 and 14 which connect with the passages 15 and 16, respectively, in the body of a four-way valve I. Said passages connect with circular chamber 17 within said valve which is connected by means of a pipe 18 with a tank J, compressor, or other supply of air at constant pressure.

19 is a fourth passage in the valve casing leading from the chamber 17 to atmosphere. 20 is a central bore in said casing leading upwardly from the chamber 17, and the bottom of said chamber is preferably formed by a removable plate 21. The passages 15, 16 and 19 all lead downwardly into said chamber and their inner ends are at equal radial distances from the bore, and are spaced as follows.

The inner ends of passages 15 and 16 are diametrically opposite and each ninety degrees from the vertical plane of the pipe 18, while the inner end of the passage 19 is at the opposite side of the case from pipe 18 and ninety degrees from each of the passages 15 and 16.

22 is a circular disk fitting in the upper part of the chamber 17 and provided with a vertical axial stem 23 which extends up through the bore 20 and is engaged exteriorly to the casing by an operating handle 24. The disk 22 is provided with two ports 25 and 26 cut vertically through the disk and an arc shaped groove 27 concentric with the stem 23 cut in the upper surface of the disk.

The ports 25 and 26 are ninety degrees apart, and the groove 27 is ninety degrees in length and its ends are ninety degrees from the ports 25 and 26. When the parts are assembled, the vertical plane of the handle 24 intersects the disk 22 at a point half way between the ports 25 and 26 in said disk.

It is evident that if the handle 24 is positioned as shown in Fig. 7, all of the passages 15, 16 and 19 are sealed from the chamber 17 so that no compressed air passes through the valve. When the handle is moved into the proper position, shown as downwardly in Fig. 7, to register the port 25 with the inner end of the passage 15, the groove 27 connects the inner end of the passage 15 with the inner end of the passage 19. Thus compressed air is then admitted from the compressor J through the pipe 13 to the rear side of the piston 12, thus forcing said piston forwardly in the cylinder G and closing the shears for the severing of the blank. On the other hand, when the handle is thrown into opposite direction to register the port 26 with the inner end of the passage 16, compressed air is admitted against the front of the piston 12 and the shears open. In each case it is evident that when air is admitted at one end of the cylinder G, the compressed air on the other side of the piston is exhausted through the groove 27 and passage 19 to atmosphere.

Below the shear members D and E is located a valve casing K of rectangular vertical cross section, having its front end closed and its rear end open. At the center of its end the casing is connected with the tank J by a pipe 28, thus admitting a constant supply of compressed air at constant pressure into the front end of the casing. The top and bottom walls of the casing are provided with a pair of oppositely placed ports 29 and 30. The port 30 is connected by a flexible pipe or hose 31 with a nozzle 32 which extends up through the shear blade 3 so as to be positioned beneath the discharge port 1 when the shears are closed. The port 29 is connected by a pipe 33 with a pressure reducing valve L.

34 is a valve plug sliding in the casing K, whose outward movement is limited by means of a pin 35 extending through the wall of the casing and engaging a groove 36 in the plug. Said plug is provided with a vertical cross passage 37 which connects the two ports 29 and 30 in the walls of the casing when the plug has assumed its innermost position in the casing. 38 is an L-shape passage in the inner end of the plug which connects the pipe 28 with the port 29 when the plug has assumed its outward position in the casing. An arm 39 depends from the cross head 10 through a slot in the casing H and bears against the rear end of the valve plug 34 to advance said plug in the casing K as the piston 12 completes its forward movement in the cylinder G, so that as the neck of the blank $b$ is severed by the closing shear blades 3 and 4, the ports 29 and 30 will be connected together by the passage 37.

The valve L is of the following construction. Its casing 40 is provided with a threaded port 41 which is connected by a pipe 42 with the front end of a compressed air reservoir M whose capacity is adjustable by means of a piston 43 whose position is regulated by means of a screw rod 44 extending through the rear end of the reservoir, the reservoir being of cylindrical shape and the piston snugly fitting the interior of the same.

At right angles to the port 41 said casing 40 is provided with a second threaded port 45 whose inner end is of reduced diameter to form a ball valve seat 46 and then extends inwardly at reduced diameter to connect with the port 41. The port 45 is connected by the pipe 33, already described, to the port 29 in the valve casing K. 47 is a ball valve adapted to engage the seat 46 and whose outward movement is limited by the stop 48. 49 is a bore extending into the casing 40 at the opposite end from the port 45 and at a lower level than the latter. Said bore is provided at its inner end with a reduced ball valve seat 50 which is connected by the L-shape passage 51 with the port 45 outside of the ball valve 47. The bore 49 is also connected with the port 41, in front of the ball valve seat 50 by means of a passage 52.

53 is a ball valve adapted to seat in the valve seat 50 and resiliently held in place in said seat by means of a helical spring 54 seated in a cup washer 55 whose outer end is engaged by the inner end of a screw bolt 56 which is threaded in the bore of a plug 57 which is screwed into the threaded outer end of the bore 49. It is evident that by adjusting the bolt 56 the pressure of the spring 54 in holding the ball 53 in its seat may be nicely regulated, so that any desired pressure in the passage 51 will be required to unseat the ball 53.

It is evident that when the shears are closed to sever the blank $b$ from the neck, the nozzle 32 will be positioned at the lower end of the discharge port 1, and the passage 37 in the plug 34 will connect the ports 29 and 30, thus connecting the nozzle 32 with the pipe 42 and port 41, past the ball valve 47, and through the port 45 into the pipe 33 and thus into the hose 31 and out through the nozzle 32. The result will be that a sharp blast of compressed air will be directed against the base of the glass butt $c$ in the port 1, thus forcing said butt up along said hole, as shown in Fig. 1 and Fig. 6, so that the scar or chilled end caused by contact with the shear blades will be melted and eliminated, because it has been forced out of contact with the shear blades and up into the zone of the heat from the molten glass, and also holding said butt in its elevated position within said discharge port until the loaded mold has been removed and a fresh mold substituted and the operator is ready for the formation and severing of a fresh blank.

The reservoir M is of limited capacity and its capacity is adjusted, so that just the proper quantity of air at the desired pressure is directed against the severed neck of glass when the shearing operation is completed to force the severed butt of glass up in the port 1 to the desired height.

When the shears are opened after the shearing operation has been completed, the valve plug 34 follows the retreating arm 39 owing to the constant air pressure against the front end of the plug within the casing K. When the plug reaches its outermost position, the L-shape port 38 registers with the port 29 in the casing, thus connecting the pipe 33 with the live air supply in the tank J. Thus compressed air at tank J pressure is admitted through the pipe 33 to port 45 of the valve L. Such entering pressure closes the ball valve 47, so that the entering compressed air enters through passage 51 and opening the ball valve 53 passes through the passage 52, the port 41 and the pipe 42 into the reservoir M, replenishing the air supply in said reservoir. When the combined pressure of the spring 54 and the back pressure in the pipe 42 exceeds the entering pressure in passage 51, the ball valve 53 will be returned into its seat, thus cutting off communication between the reservoir M and the tank J. Thus, by adjusting the compression of the spring 54, the pressure stored in the reservoir M may be nicely regulated to suit the requirements at the nozzle 52. Thus both the quantity of air forming the nozzle blast and its pressure may be adjusted to the exact requirements.

58 represents a pair of eccentric disks pivotally mounted as by means of screw bolts 59 on the top of the casing of valve I, by means of which the swing of the valve lever 24 is limited. By turning the disks on their bolts the arc of movement of the lever may be lengthened or shortened, as desired, and thereby the degree in which the valve ports are opened and the amount of air admitted to the cylinder G may be adjusted nicely to the requirements.

The advantages of my invention are many. Among them may be mentioned the following.

The scar or chilled end of the severed neck of glass is promptly forced up away from the shear blades so that the latter may be reopened at once without the glass issuing immediately from the discharge port and the loaded mold removed and an empty mold substituted without delay. The scar is eliminated, thus avoiding waste or imperfect products in the molds. The holding back of the glass until a fresh blank is needed enables me to use a discharge port of larger diameter, thus facilitating the descent of a larger volume of glass in a shorter time than is possible in the use of a discharge port of less diameter. In the latter case to obtain a blank of the proper quantity, the flow through the hole must be prolonged with the result that air bubbles are carried into the mass of glass in the mold. It is evident, therefore, that blanks may thus be formed and severed at more frequent and uniform intervals.

The use of a blast of air of predetermined volume and progressively diminishing force enables me to hold the neck of glass supported in the discharge port in the zone of remelting heat to eliminate the scar and at the same time prevents the neck of glass being forced through the discharge port into the bath of molten glass with the consequent formation of air bubbles.

What I desire to claim is:—

1. In the control of the flow of molten glass through the discharge port of a container between intermittent shearing operations, the method of applying to the outer end of said port a blast of compressed gaseous fluid of predetermined volume and progressively diminishing pressure to force the glass neck inwardly along said port, for the purposes described.

2. In the control of the flow of molten glass through the discharge port of a container between intermittent shearing operations, the method of forcing the glass neck inwardly along said port to eliminate the shear scar by remelting and to hold the glass temporarily retracted which consists in applying to the outer end of said port a blast of compressed gaseous fluid of predetermined volume and progressively diminishing pressure, for the purposes described.

3. In combination with a container for molten glass provided with a discharge port, severing means associated with the said port, and means for applying a blast of gaseous fluid of predetermined volume and progressively diminishing pressure to the outer end of said port after each operation of said shearing means, for the purposes described.

4. In combination with a container for molten glass provided with a discharge port, means for intermittently severing blanks from the glass flowing out through said port, and means for applying a blast of gaseous fluid of predetermined volume and progressively diminishing pressure to the outer end of said port after each severing operation, for the purposes described.

5. In combination with a container for molten glass provided with a discharge port, means for intermittently severing blanks from the glass flowing out through said port, means for applying a blast of gaseous fluid of predetermined volume and progressively diminishing pressure to the outer end of said port after each severing operation, and means for sealing the outer end of said port to prevent the escape of said pressure, for the purposes described.

6. In combination with a container for molten glass provided with a discharge port, means for intermittently severing blanks from the glass flowing out through said port, a closed fluid pressure container, means for applying a blast of gaseous fluid from said fluid pressure container to the outer end of said port after each shearing operation, and means for replenishing the contents of said fluid pressure container after each application of the blast, for the purposes described.

7. In combination with a container for molten glass provided with a discharge port, means for intermittently severing blanks from the glass flowing through said port, a closed fluid pressure container, means for adjusting the capacity of said fluid pressure container, means for applying a blast of gaseous fluid from said fluid pressure container to the outer end of said port after each severing operation, and means for replenishing the contents of said fluid pressure container after each application of the blast, for the purposes described.

8. In combination with a container for molten glass, provided with a discharge port, means for intermittently severing blanks from the glass flowing from said port, a closed fluid pressure container, means for admitting a blast of gaseous fluid from said fluid pressure container to the outer end of said port after each severing operation, and means for replenishing the contents of said fluid pressure container after each blast is concluded, for the purposes described.

9. In combination with a container for molten glass provided with a discharge port, means for intermittently severing blanks from the glass flowing from said port, a closed fluid pressure container, means for admitting a blast of gaseous fluid from said container to the outer end of said port after each severing operation, means for replenishing the contents of said fluid pressure container after each blast is concluded, and a common valve controlling the operation of all of said above mentioned means, for the purposes described.

10. In combination with a container for molten glass provided with a discharge port, an annular flange surrounding the outer end of said port, a pair of pivotally mounted shear members associated with said port for severing blanks of glass, and a semi-annular flange on each of said members adapted to encircle said annular flange when the members are closed to seal the outer end of said port, for the purpose described.

11. In combination with a container for molten glass provided with a discharge port, blank shearing means associated with said port, an air-blast nozzle adjacent to said port, a three way valve actuated in unison with said shearing means, a source of compressed air supply, a compressed air reservoir, and connections between said valve and said nozzle, said source of compressed air supply and said reservoir, respectively, whereby when said shearing means are inoperative said reservoir is replenished from said source of compressed air supply and when said shearing means are operative said reservoir is connected with said nozzle.

12. In combination with a container for molten glass provided with a discharge port, blank shearing means associated with said port, an air blast nozzle adjacent to said port, a three way valve actuated in unison with said shearing means, a source of compressed air supply, connections between said valve and said nozzle, said source of compressed air supply and said reservoir, respectively, whereby when said shearing means are operative said reservoir is connected with said nozzle and when said shearing means are inoperative said reservoir is replenished from said source of compressed air supply, and a pressure limiting device, controlling the admission of air into said reservoir.

Signed at Pittsburgh, Penna., this 28th day of December, 1916.

WILLIAM J. MILLER.